United States Patent
Drory et al.

(10) Patent No.: US 7,895,277 B2
(45) Date of Patent: Feb. 22, 2011

(54) CONDITIONAL REMINDERS FOR CONVEYED ELECTRONIC MESSAGES

(75) Inventors: Tal Drory, Haifa (IL); Thomas R. Haynes, Apex, NC (US); David Konopnicki, Haifa (IL); Yafit Sami, Rishon Le Ziyon (IL); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 11/873,680

(22) Filed: Oct. 17, 2007

(65) Prior Publication Data

US 2009/0106365 A1    Apr. 23, 2009

(51) Int. Cl.
G06F 15/16 (2006.01)
G06F 15/173 (2006.01)

(52) U.S. Cl. .................................. 709/206; 709/224
(58) Field of Classification Search .................. None
See application file for complete search history.

(56) References Cited

U.S. PATENT DOCUMENTS

| | | | | |
|---|---|---|---|---|
| 5,165,012 A * | 11/1992 | Crandall et al. | .............. | 715/809 |
| 5,416,725 A * | 5/1995 | Pacheco et al. | .............. | 702/176 |
| 6,108,688 A * | 8/2000 | Nielsen | ............ | 709/206 |
| 6,249,807 B1 * | 6/2001 | Shaw et al. | .............. | 709/206 |
| 7,124,167 B1 * | 10/2006 | Bellotti et al. | .............. | 709/206 |
| 7,327,834 B1 * | 2/2008 | Hiers et al. | ............. | 379/88.18 |
| 2001/0034769 A1 * | 10/2001 | Rast | ............. | 709/206 |
| 2004/0044583 A1 * | 3/2004 | Thibault | ............. | 705/26 |
| 2005/0277872 A1 * | 12/2005 | Colby et al. | .............. | 604/67 |
| 2007/0016643 A1 * | 1/2007 | Boss et al. | .............. | 709/206 |
| 2007/0077883 A1 * | 4/2007 | Childers et al. | .............. | 455/3.05 |
| 2007/0174404 A1 * | 7/2007 | Hui et al. | ............. | 709/207 |
| 2007/0192423 A1 * | 8/2007 | Karlson | ............. | 709/206 |
| 2008/0031639 A1 * | 2/2008 | Knodt et al. | ............. | 399/8 |
| 2008/0104175 A1 * | 5/2008 | Keohane et al. | ............ | 709/206 |
| 2008/0147810 A1 * | 6/2008 | Kumar et al. | .............. | 709/206 |
| 2009/0106041 A1 * | 4/2009 | Anderson et al. | ............. | 705/1 |
| 2009/0125588 A1 * | 5/2009 | Black et al. | ............. | 709/204 |
| 2009/0144370 A1 * | 6/2009 | Maj et al. | ............ | 709/206 |

* cited by examiner

*Primary Examiner*—Aaron Strange
*Assistant Examiner*—Margishi Desai
(74) *Attorney, Agent, or Firm*—Patents on Demand, P.A.; Brian K. Buchheit; Scott M. Garrett

(57) ABSTRACT

The present invention discloses a solution for providing conditional reminders for electronic messages. The solution can identify an electronic message conveyed from a sender to a recipient, wherein the electronic message is an email message or text exchange message. A software program can determine a response time and a response condition for the electronic message. When the response time expires and when the response condition is unsatisfied, a software program can present a reminder to the sender and/or the recipient, where the reminder indicates that a response is due. When a software program detects a recipient action that satisfies the response condition before the response time expires, no reminder will be presented to either the sender or the recipient.

20 Claims, 2 Drawing Sheets

CONDITIONAL REMINDERS FOR CONVEYED ELECTRONIC MESSAGES

BACKGROUND

1. Field of the Invention

The present invention relates to the field of collaboration software and, more particularly, to conditional reminders for conveyed electronic messages.

2. Description of the Related Art

An importance of electronic communication technologies continues to increase as technology bridges geographic barriers, which once limited interpersonal interactions. For example, large organizations are increasing organizing activities along functional instead of geographic lines, which results in project specific teams being physically located in different regions. Despite these distances, email, text exchange messages (e.g., chat, instant messaging, and text messaging), co-browsing, teleconferencing, and other communication technologies permit team members to easily, efficiently, and effectively interact. An equivalent phenomenon has permeated social interactions as well, as recognized with an increasing utilization of social networking sites, such as MYSPACE, where geographic distance between social contacts is largely irrelevant.

An increasing reliance upon electronic communication technologies results in many new challenges for communicators. For instance, communicators commonly receive numerous different forms of important communications at approximately the same time. For example, a person can receive a phone call concerning one matter, an email concerning another, and a text exchange message about a third. In the course of handling all of these communications, it is very easy for the person to overlook one or more of the received communications. This is especially true if one of the matters is time sensitive (i.e., an instant messaging message asking if the person wants to go to lunch with a co-worker or friend, for example). Failure to respond in a timely fashion can result in a mistaken impression that a message recipient is intentionally ignoring a sender or believes the sender's correspondence to be relatively unimportant.

At present, many communication suites include a scheduling or time management component (e.g., a TODO list), which presents alerts or notices in advance of events. These notices, however, fail to significantly help with the above problem. For one thing, establishing a TODO item based upon a received communication generally requires the recipient to actively take actions to either accept a TODO item or to create a TODO item. In regards to sending TODO items to be accepted, it is a bit presumptuous and/or can be bad etiquette for senders to convey TODO items for many matters discussed in email or text exchange messages, such as possible lunch plans. This practice generally overloads a recipient's calendar with "annoying" entries that obscure entries within the calendar that the recipient finds to be extremely important. In regards to recipients establishing TODO items, the primary reason that a communication is not responded to is that a recipient is distracted by another matter or simply overlooks a correspondence. In either case, the recipient will certainly not take extra actions to establish a TODO item, when an equivalent time could be spent simply responding to the received message. What is needed is a solution for providing and/or configuring reminders for electronic messages so that recipients do not overlook important messages or respond in an untimely fashion.

SUMMARY OF THE INVENTION

The present invention discloses a solution for presenting conditional reminders for responding to electronic messages in accordance with an embodiment of the inventive arrangements disclosed herein. The conditional reminders can be conditioned upon whether a recipient responds to a sender's message, where the reminder is presented only if a response does not occur within an established time frame. The reminders can be configured by a sender, by a recipient, or by both. Reminders can be presented upon a sender's device, upon a recipient's device, or both. Additionally, the electronic messages can include email messages, text exchange messages (e.g., chat, instant messaging, and text messaging), and the like.

The present invention can be implemented in accordance with numerous aspects consistent with the material presented herein. For instance, one aspect of the present invention can include a method for providing conditional reminders for electronic messages. The method can identify an electronic message conveyed from a sender to a recipient, wherein the electronic message is an email message or a text exchange message (e.g., chat message, instant message, and text message). A software program can determine a response time and a response condition for the electronic message. When the response time expires and when the response condition is unsatisfied, a software program can present a reminder to the sender and/or the recipient, where the reminder indicates that a response is due. When a software program detects a recipient action that satisfies the response condition before the response time expires, no reminder will be presented to either the sender or the recipient.

Another aspect of the present invention can include a method for presenting reminders related to electronic messages. The method can identify a sent electronic message. A conditional reminder established for the electronic message can be detected, which specifies an evaluation time and at least one evaluation condition. Activities conducted with a message handling interface that a recipient of the electronic message uses to interact can be monitored. Results from monitoring the activities can be used to determine if the at least one evaluation condition has been satisfied. When the evaluation time expires and when the at least one evaluation condition is unsatisfied, a reminder can be presented the sender and/or the recipient, where the reminder indicates that an action relating to the sent and/or received electronic message is needed.

Still another aspect of the present invention can include a software program for presenting reminders relating to electronic messages. The software program can include a condition evaluation engine configured to identify a set of conditions established for an electronic message, which has been sent from a sender to a recipient. The set of conditions can be message-specific conditions established by the sender and/or the recipient. The conditions that are able to be evaluated by the condition evaluation engine include whether the electronic message has been read and whether the electronic message has been responded to. Whether the conditions have occurred is determined at an expiration of an evaluation response time, which is established for the electronic message by the sender and/or the recipient. At least one conditional action can be taken by the condition evaluation engine when the conditions are unsatisfied at the expiration of the evaluation response time. The conditional action can include presenting a notification to the sender and/or to the recipient that indicates an action related to the received electronic message is needed.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
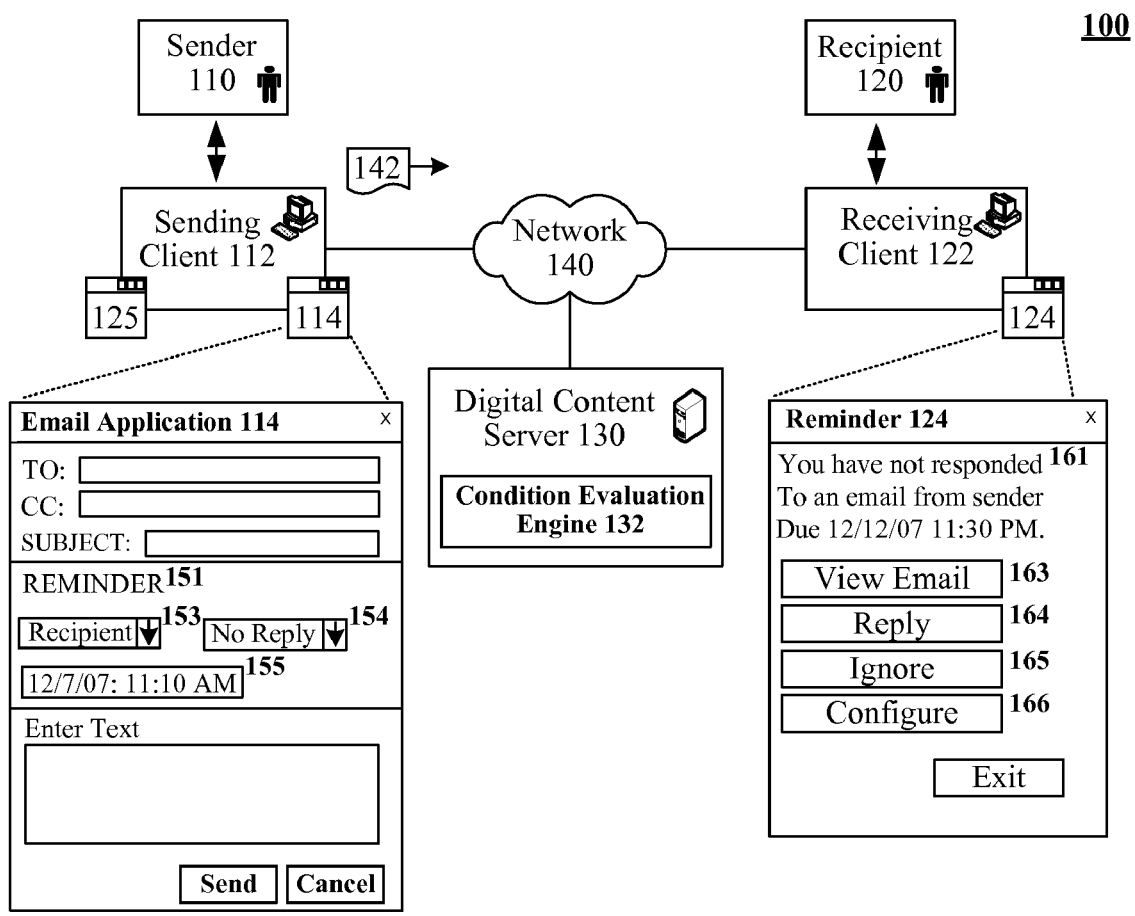
FIG. 1 is a schematic diagram of a system that provides conditional reminders for electronic messages in accordance with an embodiment of the inventive arrangements disclosed herein.

FIG. 1 is a schematic diagram of a system 100 that provides conditional reminders for electronic messages 142 in accordance with an embodiment of the inventive arrangements disclosed herein. In system 100, a sender 110 using sending client 112 can convey an electronic message 142 over a network 140 to a receiving client 122. A digital content server 130 can optionally be a communication intermediary between client 112 and client 122. One or more deterministic conditions can be imposed upon the electronic message 142 by the sender 110 and/or by the recipient 120. When the deterministic condition occurs, a reminder 124, 125 related to the electronic message 142 can be presented to recipient 120 and/or the sender 110. The reminder 124 can, for example, indicate 161 that a response is due for the electronic message 142 and can provide multiple options 163-166 related to the response.

System 100 can be adapted for multiple different types of electronic communications, including email, text exchange, video teleconferencing, co-browsing, and the like. Text exchange includes any type of real-time or near real time messaging involving text, such as Instant Messaging, text messaging, chatting, and the like. Depending upon a type of electronic communication used in system 100, digital content server 130 can be implemented as an email server, a chat server, an instant messaging server, and the like. Although a condition evaluation engine 132 is shown in FIG. 1 as residing on the server 130, other implementations are contemplated. For example, in one implementation, engine 132 can be a client-side program that resides on clients 112 and 122. In another implementation, engine 132 be implemented by a network element other than server 130; such as in an implementation where the conditional reminders are implemented as a Web service.

The reminder 124 is directly associated with the electronic message 142. Reminders 124 are only presented when response conditions associated with the message 142 have not been satisfied. Further, the reminders 124 of system 100 are able to be directly integrated into an application that sends/receives the electronic message 142. So when the message 142 is an instant message, the reminders 142 are integrated within an instant messaging application; and, when the message 142 is an email message, the reminders 142 are directly integrated within an email application.

This approach contrasts that of a contact management suite, such as OUTLOOK, where different applications using a common front end interface having TODO, calendaring, and email capabilities exist. In the OUTLOOK approach, reminder spawning items, such as TODO alerts are distinct from electronic mail items. Further, the TODO items of existing suites sharing a front end are not able to be linked to a set of response conditions relating to recipient behavior regarding the electronic message 142.

Response conditions and associated reminders 124 prevent a recipient 120 from inadvertently failing to respond to an electronic communication, which commonly occurs when the recipient 120 is distracted or when the recipient 120 is involved in multiple different electronic communications at once. A condition evaluation engine 132 can monitor behavior associated with electronic message 142 against a set of message 142 specific conditions, which can produce reminder 124 spawning events depending upon a manner in which engine 132 evaluates conditions verses behavior. The condition evaluation engine 132 can be a software program executed by server 130 or by a client 122, 112. Further, evaluation engine 132 can be located within a network element, which provides message reminders 124 as part of a Web service.

In one embodiment, the sending client 122 can include a message sending interface 114, which permits reminders 151 to be added to the electronic message 142. Different sender 110 configurable settings 153-155 can be established for message reminders. For example, a sender 110 can use interface element 153 to specify whether reminders 124 are to be presented to a recipient 120, to a sender 110, or both. A date/time element 155 can establish a date/time that a response to the message 142 is due. The condition element 154 can establish one or more conditions that are to be evaluated when the date time from element 155 expires to determine if a reminder 124 is to be presented. Condition can include, but are not limited to, determining whether the electronic message 142 has been read by the recipient 120, determining whether the recipient 120 has responded to the message 142, and always presenting a reminder at the established time 155. The time 155 can be an absolute time or a relative time (e.g., a reminder if ten minutes have passed from a time the message was received and the recipient 120 has yet to respond). Sender 110 established conditions and reminder settings can be recorded as metadata of the electronic message 142 itself or can be contained in a separate file conveyed along with the message 142.

The receiving client 122 can include a message receiving interface 124, which permits the message 142 and reminder 124 to be presented to the recipient 120. Each reminder 124 can include text 161 informing the recipient 120 of details pertaining to a message 142, which has not been properly responded to. The details can, for example, indicate a subject and/or context of the message 142, a time the message 142 was received, a time a response was due, and the like. An interface in which the reminder 124 is presented can provide an option 163 to view the original message 142, to instantiate an application and initiate a reply 164 to the message 142, and an option to ignore 165 the reminder 124.

Further, the interface 124 can permit a recipient 120 to configure 166 reminder conditions for received electronic messages 142. Thus, the reminder 124 can be presented responsive to a sender 110 established condition, a recipient 120 established condition, or a combination of the two. Recipient configurable settings 166 can include, but are not limited to, establishing a response expiration time for replying to an incoming message 142. Different expiration times can be associated with different types of messages; such as a ten minute reminder time for failing to respond to an instant messaging communication and a twenty four hour response time for failing to respond to an email communication. Further, different reminder times can be established for different senders 112 or groups of senders 112. Reminder times can vary based on message 142 content (e.g., based on recipient 120 established key words for example), different times of day, different conditions of application 124 (e.g., minimized or open, different available status's set for recipient—available, busy, offline, etc, and other conditions), and the like.

Each of the clients 112, 122 can be a computing device able to send/receive electronic messages. For example, the clients 112, 122 can be computers, personal data assistants, mobile phones, mobile email or text exchange devices, email or text exchange kiosks, entertainment consoles, media playing devices, and the like. The digital content server 130 can be any server, physical or virtual, that facilitates communications between the clients 122, 122. Server 130 refers to hardware and software needed to facilitate an exchange of the electronic messages 142. Server 130 is an optional component of system 100 in contemplated embodiments where peer-to-peer connections exist between the clients 112, 122.

The network 140 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 140 can include local components and data pathways necessary for communications to be exchanged among computing device components and between integrated device components and peripheral devices. The network 140 can also include network equipment, such as routers, data lines, hubs, and intermediary servers which together form a packet-based network, such as the Internet or an intranet. The network 140 can further include circuit-based communication components and mobile communication components, such as telephony switches, modems, cellular communication towers, and the like. The network 140 can include line based and/or wireless communication pathways.

Each of the clients 112, 122 and the server 130 can have access to one or more data stores (not shown) within which electronic messages 142 and reminder settings can be stored. The various data stores of system 100 can each be a physical or virtual storage spaces configured to store digital information. The data stores can be physically implemented within any type of hardware including, but not limited to, a magnetic disk, an optical disk, a semiconductor memory, a digitally encoded plastic memory, a holographic memory, or any other recording medium. The data stores can be a stand-alone storage unit as well as a storage unit formed from a plurality of physical devices. Additionally, information can be stored within the data stores in a variety of manners. For example, information can be stored within a database structure or can be stored within one or more files of a file storage system, where each file may or may not be indexed for information searching purposes. Further, data stores can optionally utilize one or more encryption mechanisms to protect stored information from unauthorized access.

Figure 2:
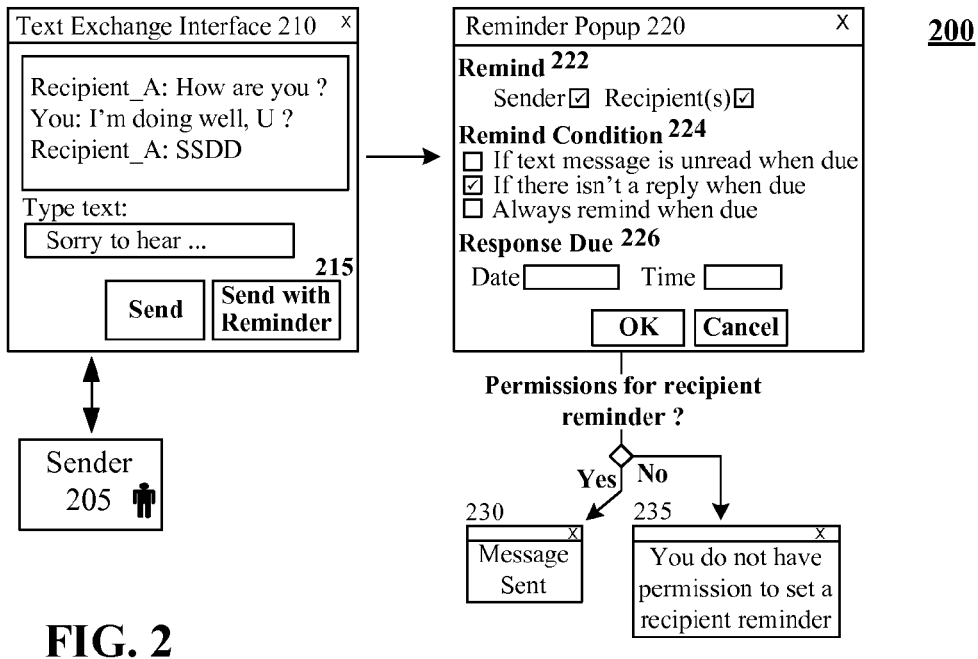
FIG. 2 is a flow diagram in which a sender sends an electronic message having sender established conditions associated with it in accordance with an embodiment of the inventive arrangements disclosed herein.

FIG. 2 is a flow diagram 200 in which a sender 205 sends an electronic message having sender 205 established conditions associated with it in accordance with an embodiment of the inventive arrangements disclosed herein. Diagram 200 can be used in the context of system 100 or any system permitting conditional reminders against electronic messages.

In the diagram 200, a sender 205 can use an interface 210, such as a text exchange interface, to convey a text or other electronic message to a recipient. The interface 210 can include an option 215 to send a message with a reminder. When the option 215 is selected, a reminder popup 220 can appear that permits the sender 205 to specify 222 who a reminder is to be presented to, which can include the sender 205, the recipient, or both. Reminder conditions 224 can also be specified, such as triggering a reminder always, only when the sent message is unread, or only when a message hasn't been responded to. Sender 205 can further specify a response due time 226, at which point the conditions 224 are to be evaluated to determine if a reminder should be presented.

It should be appreciated that it can be challenging to determine whether some types of electronic messages (i.e., text exchange messages) have been read or not. A number of emerging techniques can be used for this determination, any of which can be used for purposes of the present invention. For example, U.S. patent application Ser. No. 11/845,453 entitled "SYSTEM AND METHOD FOR PROVIDING MESSAGE STATUS IN CHAT MESSAGING" teaches a technique for inferring whether a chat (or other text exchange) message has been read by a recipient.

Once settings have been specified for interface 220 and if a reminder is to be presented to a recipient (determined from settings of element 222), a check can be performed to determine whether the sender 205 has sufficient permissions to establish a reminder on a recipient's machine. If not, a message 235 can be presented to the sender 205 indicating that he/she lacks sufficient privileges to establish receiver-side reminders. In one implementation, after message 235 is presented, popup 220 can re-appear, with the option 222 for reminding the recipient being changed to disallow recipient reminders. If the sender 205 has been granted privileges to establish receiver-side reminders, then a message sent indication 230 can be presented to the sender 205.

Figure 3:
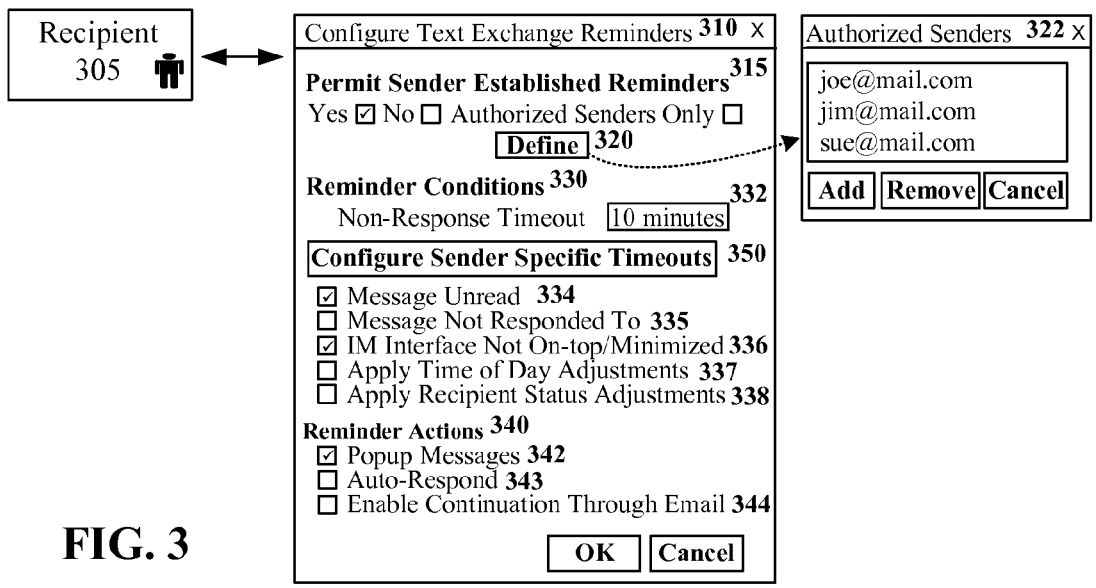
FIG. 3 is a flow diagram in which a recipient receives an electronic message having recipient established conditions associated with it in accordance with an embodiment of the inventive arrangements disclosed herein.

FIG. 3 is a flow diagram 300 in which a recipient receives an electronic message having recipient established conditions associated with it in accordance with an embodiment of the inventive arrangements disclosed herein. Diagram 300 can be used in the context of system 100 or any system permitting conditional reminders against electronic messages.

In diagram 300, a recipient 305 can use an interface 310 to specify conditions for presenting reminders. The conditions of interface 310 can apply to any type of electronic message, such as email or text exchange messages (as shown). A first portion of the interface 310 can establish rules for allowing sender specified reminders, such as those shown by diagram 200. For example, options 315 can allow all sender established reminders, can disallow all sender established reminders, or can allow reminders to be established by authorized senders only. A set of authorized senders can be defined 320, such as by adding sets of authorized senders through popup 322. Groups of senders as well as individual senders can be authorized.

Interface 310 can be used to establish recipient 305 specific reminder settings 330. One setting can specify a non-response time out 332, such as ten minutes, for when the recipient 305 hasn't responded to a received message. The timeout period 332 for producing a reminder can be a default, which can be adjusted based on a variety of other configurable settings 334-338. For example, reminders can appear only when the received message is unread 334, which can be inferred as described in diagram 200 for text exchange messages. Another condition can be that a message has not been responded to 335, or that a text exchange interface for responding is either not on top or is minimized, as shown by option 336. Time of day adjustments can be established per option 337. Time of day adjustments can permit a recipient 305 to establish different non-response time-out values for different times of day. For example, a longer than normal time-out value (e.g., fifteen minutes instead of ten minutes) can be established for messages received between 3:00 PM and 4:00 PM Monday-Friday, which can be times where a recipient 305 typically handles numerous telephone calls. Additionally, recipient status adjustments 338 can be applied. Status adjustments can refer to availability settings, such as online, off-line, in meeting, busy, and the like, which are settings available within many text exchange applications. Additionally, sender specific timeouts can be specified by selecting button 350, which can call up a popup similar to popup 322, yet which allows different timeout durations to be established for different sets of senders. In one embodiment, wild card characters can specify group characteristics, such as "*.ibm.com" which can apply to all senders having an identity ending in "ibm.com."

The interface 310 can also permit a recipient 305 to establish what actions 340 are to be taken when conditions for reminder settings are triggered. Configurable actions 340 can include, but are not limited to, presenting a popup message 342 to the recipient, automatically responding 343 using a pre-configured message, and the like. Actions 340 can even change a communication mode, such as an action 344 that enables a text exchange communication to be continued through an email communication. Such an action can automatically create an email message for the recipient 305 which shows a communication history that occurred in a text-exchange communication, which can make it easier for both the sender and recipient to place the communication continuation in context. Shifting communication modes from a real-time to a non-real time type of communication can be beneficial when significant response delays are anticipated. Similar options can be integrated into email communications to permit a recipient 305 to change a communication from a non-real time to a real-time type of communication, which can be advantageous in many situations.

It should be emphasized that the invention is not to be construed as limited to the various options and configuration settings of FIG. 2 and FIG. 3, which are provided to illustrate possible options for message specific reminders. Other conditions and actions are to be considered within the scope of the invention. For example, when reminders are presented, one contemplated option (not shown) can add content of the reminders to a TODO list responsive to a user selection in a situation where a message recipient desires to place a reminder in a calendar. In another example, an additional action for non-response events can forward an unanswered message to a recipient designated address, such as an email address or a text-exchange account of a co-worker, boss, or subordinate. In still another example, a recipient action can cause contact information, such as a phone number, to be automatically provided to a sender as well as a suggested time for calling, which is based on entries in a recipient's calendar. Of course actions to forward messages and/or automatically schedule conference times can be limited to a set of recipient configured senders and/or based on content specific criteria.

Additionally, although diagrams 200 and 300 separately show how conditions for reminders can be established by the sender (diagram 200) or a recipient (diagram 300), implementations are contemplated where both the sender and recipient are able to establish conditions for reminders. Moreover, the reminder conditions 224 shown in diagram 200 can be conditions that the recipient 305 is able to establish. Similarly, the reminder conditions 330 shown in diagram 300 can be conditions available to the sender 205 is able to establish.

Further, although the invention discusses options for email and text exchange communications, the reminders can be easily applied to other communication types, which are to be considered within scope of the invention. For example, digital faxes can be a type of message, which can be tied to message specific reminders as easily as email and text exchange messages.

It should be noted that the illustrated interfaces of FIG. 1, FIG. 2, and FIG. 3 are provided to illustrate a functionality of the disclosed invention. These interfaces are not intended to be comprehensive, and alternative arrangements of elements are contemplated. For example, although all the illustrated interfaces are graphical user interfaces, voice user interfaces can be used to produce equivalent results with regards to establishing reminder conditions and presenting reminders to a user depending upon how these conditions evaluate. In another example, different interface elements, such as menu selections, list boxes, toolbar or ribbon selections, etc. can be utilized in place of the interface elements shown in FIG. 1, FIG. 2, and/or FIG. 3.

The present invention may be realized in hardware, software or a combination of hardware and software. The present invention may be realized in a centralized fashion in one computer system or in a distributed fashion where different elements are spread across several interconnected computer systems. Any kind of computer system or other apparatus adapted for a carrying out methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for providing conditional reminders for electronic messages comprising:
    identifying, via computing equipment running at least one program, an electronic message conveyed from a sender to a recipient, wherein the electronic message is a text exchange message that is a message sent during an online chat or an instant messaging communication;

the recipient, via computing equipment running at least one program, utilizing a graphical user interface of a communication application to configure reminders for responding to incoming messages received by the communication application, wherein recipient established reminders and reminder conditions comprises response times and response conditions;

a software program, running on computing equipment, determining a response time and a response condition for responding to the electronic message, wherein the determined response time is one of the response times configured via the graphical user interface and wherein the determined response condition is one of the response conditions established via the graphical user interface; and when the response time expires and when the response condition is unsatisfied, a software program, running on computing equipment, presenting a reminder to the recipient, where the reminder indicates that a response to the electronic message is due.

2. The method of claim 1, further comprising:
a software program, running on computing equipment, detecting a recipient action that satisfies the response condition before the response time expires, which results in no reminder being presented to either the sender or the recipient.

3. The method of claim 1, further comprising:
wherein communication application is a client-side application running on a device of the recipient, wherein the software program that determines the response time and the response condition and the software program that presents the reminder are client-side programs running on the device of the recipient.

4. The method of claim 1, further comprising:
configuring presentation settings, via the graphical user interface, that determine whether the reminder is to be presented on a computer of the sender, on a computer of the recipient, or upon both the computer of the sender and the computer of the recipient, wherein each of these three options are options presented to the recipient via the graphical user interface.

5. The method of claim 1, further comprising:
within the graphical user interface, configuring the response condition, wherein configurable response conditions presented in the graphical user interface comprise: a condition to present the reminder when the electronic message has not been read when the response time expires, a condition to present the reminder when no reply has been sent to the electronic message when the response time expires, and a condition that always presents a reminder when the response time expires.

6. The method of claim 1, wherein the graphical user interface includes an option to permit the recipient to selectively permit sender established reminders, wherein the option includes a recipient selectable element to not permit sender established reminders, an option to permit sender established reminders, and an option to only permit sender established reminders for a set of users, who are explicitly defined one-at-a-time by the recipient via the graphical user interface.

7. The method of claim 1, wherein the electronic message is an instant messaging communication, and wherein the communication application is an instant messaging application, wherein the graphical user interface is a front end for the instant messaging application.

8. The method of claim 1, wherein the electronic message an online chat communication, and wherein the communication application is an online chat application, wherein the graphical user interface is a front end for the online chat application.

9. The method of claim 8, further comprising:
within the graphical user interface, the recipient establishing for different sets of senders, different times that actions related to the electronic message are to be taken by the recipient, wherein the determined response time is determined from matching a sender of the electronic message to one of the different sets of senders and basing the response time of the sender set specific time established by the recipient.

10. The method of claim 1, further comprising:
within the graphical user interface, the recipient establishing a plurality of sets of words, wherein different sets of words are associated with different recipient established times that actions related to the electronic message are to be taken; and a program searching the electronic message to match words contained within the electronic message to words contained within said sets of words, wherein said determined response time is based upon results of the searching step.

11. The method of claim 8, wherein the graphical user interface provides user configurable options to pop-up messages, to auto-respond, and to respond to the text exchange message through email, wherein the method further comprising:
when the response time expires and when the response condition is unsatisfied and when the option to provide pop-up messages is established via the graphical user interface, a software program, running on computing equipment, presenting the reminder via a popup;
when the response time expires and when the response condition is unsatisfied and when the option to provide auto-respond is established via the graphical user interface, a software program, running on computing equipment, automatically responding to the text exchange message;
when the response time expires and when the response condition is unsatisfied and when the option to respond through email is established via the graphical user interface, a software program, running on computing equipment, responding to the text exchange message via an email response.

12. The method of claim 1, wherein the text exchange message is a message sent by the sender to the recipient using a communication address unique to the recipient.

13. The method of claim 1, wherein the electronic message is a text exchange message, wherein the reminder is presented to the sender, wherein the reminder comprises a message that indicates to the sender that the recipient will continue communications of an original text exchange session by replying within an email message.

14. A method for presenting reminders related to electronic messages comprising:
identifying, at a receiving computing device running software stored on a storage medium of the computing device, a sent electronic message;
detecting, at the receiving computing device running software stored on a storage medium of the computing device, a conditional reminder previously established for the electronic message, said conditional reminder specifying an evaluation time and at least one evaluation condition, wherein the evaluation time, the evaluation condition, and the conditional reminder are user-configurable parameters established by the email recipient through a graphical user interface;

monitoring at the receiving computing device running software stored on a storage medium of the computing device, activities conducted with a message handling interface that a recipient of the electronic message uses to interact;

using results from monitoring the activities to determine, at the receiving computing device running software stored on a storage medium of the computing device, if the at least one evaluation condition has been satisfied; and when the evaluation time expires and when the at least one evaluation condition is unsatisfied, the receiving computing device running software stored on a storage medium of the computing device presenting a reminder, where the reminder indicates that an action relating to the received electronic message is needed.

15. The method of claim 14, wherein the electronic message is a video teleconferencing message or a co-browsing message.

16. The method of claim 14, wherein the electronic message is an email message, and wherein the message handling interface is an email interface, and wherein the method further comprises:

when the evaluation time expires and when the at least one evaluation condition is unsatisfied, the receiving computing device running software stored on a storage medium of the computing device, sending an email to the sender, wherein the reminder indicates that an action relating to the received electronic message is needed.

17. The method of claim 14, wherein the electronic message is an email message sent by a sender to a plurality of different recipients including the recipient using the receiving computing device, wherein the method further comprises:

the receiving computing device running software stored on a storage medium of the computing device, sending an email to the at least one of the other recipients of the email message, wherein the email indicates that an action relating to the received electronic message is needed.

18. A software program for presenting reminders relating to electronic messages comprising:

a condition evaluation engine configured to identify a set of conditions established for an electronic message, which has been sent from a sender to a recipient, wherein the set of conditions are configurable message-specific conditions established by a recipient, wherein conditions able to be evaluated by the condition evaluation engine include whether the electronic message has been read and whether the electronic message has been responded to, wherein whether the conditions have occurred is determined at an expiration of an evaluation response time, which is established for the electronic message by the recipients, wherein at least one conditional action is taken by the condition evaluation engine when the conditions are unsatisfied at the expiration of the evaluation response time, wherein the conditional action comprises presenting a notification to the recipient that indicates an action related to the received electronic message is needed, and wherein the condition evaluation engine is implemented in software stored in a tangible, non-transitory, machine readable storage medium, said software when executed by a machine causing the machine executing the software to perform a set of actions for which the condition evaluation engine is configured, wherein the electronic message is at least one of an instant messaging message, an online chat message, a video teleconferencing message, and a co-browsing message.

19. The software program of claim 18, wherein the electronic message is an instant messaging message.

20. The software program of claim 18, wherein the electronic message is an online chat message, a video teleconferencing message, or a co-browsing message.

\* \* \* \* \*